US007935662B2

(12) United States Patent
Parlar et al.

(10) Patent No.: US 7,935,662 B2
(45) Date of Patent: May 3, 2011

(54) SYSTEM, METHOD, AND APPARATUS FOR INJECTION WELL CLEAN-UP OPERATIONS

(75) Inventors: Mehmet Parlar, Sugar Land, TX (US); Balkrishna Gadiyar, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 12/492,196

(22) Filed: Jun. 26, 2009

(65) Prior Publication Data
US 2009/0301722 A1 Dec. 10, 2009

Related U.S. Application Data

(63) Continuation-in-part of application No. 11/609,367, filed on Dec. 12, 2006.

(60) Provisional application No. 61/133,613, filed on Jul. 1, 2008.

(51) Int. Cl.
| C09K 8/60 | (2006.01) |
| C09K 8/14 | (2006.01) |
| C09K 8/02 | (2006.01) |
| C09K 8/68 | (2006.01) |
| C09K 8/528 | (2006.01) |
| E21B 43/16 | (2006.01) |
| E21B 37/08 | (2006.01) |

(52) U.S. Cl. ........ 507/219; 507/100; 507/103; 507/200; 507/241; 166/305.1; 166/311

(58) Field of Classification Search .................. 507/100, 507/103, 200, 219, 241; 166/305.1, 311
See application file for complete search history.

(56) References Cited

U.S. PATENT DOCUMENTS

| 3,353,600 A | 11/1967 | Annis et al. |
| 3,692,676 A | 9/1972 | Culter et al. |
| 3,960,736 A | 6/1976 | Free et al. |
| 4,387,769 A | 6/1983 | Erbstoesser et al. |
| 4,526,695 A | 7/1985 | Erbstoesser et al. |
| 4,585,482 A | 4/1986 | Tice et al. |
| 4,621,692 A * | 11/1986 | Mondshine ................. 166/281 |
| 4,715,967 A | 12/1987 | Bellis et al. |
| 4,848,467 A | 7/1989 | Cantu et al. |
| 4,957,165 A | 9/1990 | Cantu et al. |
| 4,961,466 A | 10/1990 | Himes et al. |
| 4,986,354 A | 1/1991 | Cantu et al. |
| 4,986,355 A | 1/1991 | Casad et al. |
| 5,165,477 A | 11/1992 | Shell et al. |
| 5,247,995 A | 9/1993 | Tjon-Joe-Pin et al. |
| 5,325,921 A | 7/1994 | Johnson et al. |
| 5,439,057 A | 8/1995 | Weaver et al. |
| 5,551,516 A | 9/1996 | Norman et al. |
| 5,566,759 A | 10/1996 | Tjon-Joe-Pin et al. |
| 5,678,632 A | 10/1997 | Moses et al. |
| 5,680,900 A | 10/1997 | Nguyen et al. |
| 5,881,813 A | 3/1999 | Brannon et al. |
| 5,964,295 A | 10/1999 | Brown et al. |
| 5,979,557 A | 11/1999 | Card et al. |
| 6,110,875 A | 8/2000 | Tjon-Joe-Pin et al. |
| 6,140,277 A | 10/2000 | Tibbles et al. |
| 6,258,859 B1 | 7/2001 | Dahayanake et al. |
| 6,263,967 B1 | 7/2001 | Morris et al. |
| 6,394,185 B1 | 5/2002 | Constien |
| 6,432,885 B1 | 8/2002 | Vollmer |
| 6,435,277 B1 | 8/2002 | Qu et al. |
| 6,509,301 B1 | 1/2003 | Vollmer |
| 6,534,449 B1 | 3/2003 | Gilmour et al. |
| 6,569,814 B1 | 5/2003 | Brady et al. |
| 6,599,863 B1 | 7/2003 | Palmer et al. |
| 6,631,764 B2 | 10/2003 | Parlar et al. |
| 6,638,896 B1 | 10/2003 | Tibbles et al. |
| 6,645,769 B2 | 11/2003 | Tayebi et al. |
| 6,763,888 B1 | 7/2004 | Harris et al. |
| 6,817,414 B2 | 11/2004 | Lee |
| 6,831,044 B2 | 12/2004 | Constien |
| 6,883,608 B2 | 4/2005 | Parlar et al. |
| 6,978,838 B2 | 12/2005 | Parlar et al. |
| 7,060,661 B2 | 6/2006 | Dobson, Sr. et al. |

(Continued)

FOREIGN PATENT DOCUMENTS

EP           404489         3/1995

(Continued)

OTHER PUBLICATIONS

Arauja, A. et al.; Field Use of Temporary Fluid-Loss Control Pill During Deepwater Completions in High-Permeability Formations ;SPE 53924 (1999).

Blauch, M. E., et al.; Fluid-Loss Control Using Crosslinkable HEC in High-Permeability Offshore Flexure Trend Completions; SPE 19752 (1989).

Chang, F.F. et al.; Development of a New Crosslinked-HEC Fluid Loss Control Pill for Highly-Overbalance, High-Permeability and/or High Temperature Formations; SPE 39438 (1998).

(Continued)

*Primary Examiner* — Timothy J. Kugel
*Assistant Examiner* — Aiqun Li
(74) *Attorney, Agent, or Firm* — David G. Matthews; Rodney V. Warfford; Tim Curington

(57) ABSTRACT

A method for removing drilling damage from a formation in a wellbore that has not been produced includes injecting a chemical-acting cleanup fluid and contacting it with a filter-cake on a face of a formation of interest for a period of time sufficient to loosen some of the solids embedded in the filter-cake. The method further includes circulating a solids removal fluid at a high rate through the wellbore across the face of the formation of interest, the solids removal fluid including a viscosifier, and positioning a second treatment fluid having a fluid loss control pill in the wellbore at the formation of interest. The method further includes degrading particles of the fluid loss control pill and degrading remaining bridging agent from the drilling fluid.

32 Claims, No Drawings

U.S. PATENT DOCUMENTS

| | | | |
|---|---|---|---|
| 7,084,095 B2 | 8/2006 | Lee et al. | |
| 7,166,560 B2 | 1/2007 | Still et al. | |
| 7,265,079 B2 * | 9/2007 | Willberg et al. | 507/203 |
| 7,276,466 B2 | 10/2007 | Todd et al. | |
| 7,303,018 B2 | 12/2007 | Cawiezel et al. | |
| 7,553,800 B2 | 6/2009 | Munoz, Jr. | |
| 2002/0142919 A1 | 10/2002 | Constien | |
| 2004/0014606 A1 | 1/2004 | Parlar et al. | |
| 2004/0106525 A1 * | 6/2004 | Willberg et al. | 507/200 |
| 2004/0209780 A1 | 10/2004 | Harris et al. | |
| 2005/0034865 A1 | 2/2005 | Todd et al. | |
| 2005/0056423 A1 | 3/2005 | Todd et al. | |
| 2005/0137095 A1 | 6/2005 | Cawiezel et al. | |
| 2005/0139354 A1 | 6/2005 | Salamat | |
| 2005/0161220 A1 | 7/2005 | Todd et al. | |
| 2005/0252659 A1 | 11/2005 | Sullivan et al. | |
| 2006/0042797 A1 | 3/2006 | Fredd et al. | |
| 2006/0157248 A1 | 7/2006 | Hoefer et al. | |
| 2006/0185848 A1 | 8/2006 | Surjaatmadja et al. | |
| 2006/0229212 A1 | 10/2006 | Willberg et al. | |
| 2008/0139416 A1 | 6/2008 | Rimassa et al. | |

FOREIGN PATENT DOCUMENTS

| | | |
|---|---|---|
| WO | 2003023177 | 3/2003 |
| WO | 2004007905 | 1/2004 |
| WO | 2005095755 | 10/2005 |
| WO | 2007066254 | 6/2007 |
| WO | 2007088322 | 8/2007 |
| WO | 2008072128 | 6/2008 |

OTHER PUBLICATIONS

Cole, R. Clay et al.; A New Environmentally Safe Crosslinked Polymer for Fluid-Loss Control; SPE 29525 (1995).

Hodge, R.M. et al.; The Selection and Application of Loss Control Materials to Minimize Formation Damage in Gravel Packed Completions for a North Sea Field; SPE 30119 (1995).

Kippie, David P. et al.; Chemical Fluid-Loss-Control Systems for Severe Environments: Taking Conventional Systems to a Higher Level; SPE 73771 (2002).

Lamb, Keith F. et al; Fluid Loss Pills Control Losses through Sand Control Screens without Damage or Cleanup; SPE 110692 (2007).

Luyster, M.R. et al.; Development of a Novel Fluid-Loss Control Pill for Placement Inside Gravel-Pack Screens; SPE 58734 (2000).

Nguyen, Philip D. et al.; Development and Field Application of a New Fluid-Loss Control Material; SPE 36676 (1996).

Parlar, M. et at; Guidelines for Selection of Fluid Loss Control Methods Before and After Sand Control Treatments to Maximize Well Productivity and Cost-Effectiveness; SPE 39460 (1998).

Ross, Colby M. et al.; Current Materials and Devices for Control of Fluid Loss; SPE 54323 (1999).

Vollmer, D.P. et at; Brine and Permeability Effects on Crosslinked Fluid-Loss Pill Filter-Cake Formation; SPE 93319 (2005).

U.S. Appl. No. 11/609,367 Office Action dated Oct. 25, 2010.

* cited by examiner

SYSTEM, METHOD, AND APPARATUS FOR INJECTION WELL CLEAN-UP OPERATIONS

CROSS-REFERENCE TO RELATED APPLICATIONS

The present application claims the benefit of U.S. provisional patent application No. 61/133,613 entitled "METHODS FOR ACHIEVING HIGH INJECTIVITIES IN OPEN-HOLE COMPLETIONS," filed on Jul. 1, 2008, which is hereby incorporated by reference in its entirety; the present application is also a continuation-in-part of copending U.S. patent application Ser. No. 11/609,367 entitled "FLUID LOSS CONTROL AND WELL CLEANUP METHODS," filed on Dec. 12, 2006, which is hereby incorporated by reference in its entirety.

BACKGROUND

The technical field generally relates to post-drilling injection well clean-up operations, and more particularly but not exclusively relates to injection well clean-up operations in open hole completions where extensive production from the well is not utilized before injection operations begin. Damage examples include fluid loss agents in the drilling fluid deposited on the formation face, other solids from the formation of interest or other formations in the wellbore entrained in the drilling fluid and deposited on the formation face, and/or a filter cake present due to leakoff of the drilling fluid into the formation and subsequent formation of the filter cake. The filter cake can include a binding agent (e.g. starch or polymer residue), solid particles, and/or a buildup of an oil-based filter cake.

Injection wells often benefit from a production period after drilling to enable clean-up of drilling fluids and other potential damage inhibiting injectivity into the formation. In many circumstances a significant production period after drilling is undesirable or impossible. For example, and without limitation, a rig may not have storage facilities for fluids from flowback, the formation may not have sufficient pressure to flow, and/or it may be desirable to begin injection operations more quickly than a clean-up by flowback will accommodate in the circumstances present for the specific well. Therefore, further technological developments are desirable in this area.

SUMMARY

One embodiment is a unique method for injection well clean-up operations. Other embodiments include methods and apparatus to enhance clean-up of injection wells. Further embodiments, forms, objects, features, advantages, aspects, and benefits shall become apparent from the following description and drawings.

DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Development of specific embodiments require numerous implementation-specific decisions that are made to achieve the developer's specific goals, such as compliance with system related and business related constraints, which will vary from one implementation to another. Such a development effort may be complex and time consuming but is nevertheless a routine undertaking for those of ordinary skill in the art having the benefit of this disclosure. While certain compositions are described herein in specific examples, such descriptions are not intended to be limiting, and compositions may be substituted or combined.

Each numerical value utilized herein is intended to be read once as modified by the term "about" (unless already expressly so modified), and then read again as not so modified unless otherwise indicated in context. Also, any ranges described herein are intended to include each possible value in the range including the end points, except where explicitly stated to the contrary. For example, "a range of from 1 to 10" is to be read as indicating each possible number along the continuum between 1 and 10 inclusive, and each possible number along the continuum between about 1 and about 10. Thus, where examples reference specific values within the range, or where examples do not include a value, any and all values within the range are contemplated herein.

Descriptions of certain techniques, methods, and procedures herein provide illustrative embodiments of performing procedures for injection well cleanup operations. Operations illustrated are understood to be exemplary only, and operations may be combined or divided, and added or removed, as well as re-ordered in whole or part, unless stated explicitly to the contrary herein.

A technique for injection well clean-up operations includes an operation to drill a wellbore through a formation of interest with a drilling fluid including a bridging agent and a filtercake developing agent. The wellbore may be vertical or horizontal, and the completion of the formation of interest may be an open hole completion or a cased completion.

The technique further includes an operation to inject a chemical-acting cleanup fluid and contact therewith a filtercake formed on the face of the formation of interest to loosen embedded solids in the filtercake. In certain embodiments, the operation to inject the chemical-acting cleanup fluid is performed before significant fluid is produced from the formation of interest. The amount of produced fluid that is significant is dependent upon the characteristics of the specific application, and an amount of fluid that is significant in one application may not be significant in another application. Non-limiting examples of fluid amounts that are not significant in certain applications include: no fluid produced from the formation of interest, an amount of fluid less than a wellbore volume, an amount of fluid such that none of the formation fluid is returned to surface, an amount of fluid significantly less than the post-drilling flowback of an offset well, an amount of fluid significantly less than a historical post-drilling flowback amount for the formation of interest in the general geographic area, and an amount of fluid less than readily available storage facilities at a surface location near the wellbore.

A chemical-acting cleanup fluid as used herein indicates a fluid performing any chemical related process on the filtercake to reduce the binding effectiveness of binding agents in the filtercake and loosen particles from the filtercake. Chemical processes include, without limitation, participation in a chemical reaction with a component of the filtercake, dissolution of any portion of the filter cake, reduction of a surface tension of any substance within the filtercake, and reaction with any substance that creates agitation that assists in physically loosening the filtercake. Specific examples, without limitation, include an oxidizer hydrolyzing a polymer (and/or a starch) in the filtercake, an enzyme hydrolyzing a polymer (and/or a starch) in the filtercake, and/or a mutual solvent breaking an emulsion and/or loosening water droplets in the filtercake.

The chemical-acting cleanup fluid can be any fluid understood in the art, and a selection factor includes compatibility with the formation of interest. Specific examples, without limitation, include a brine with an oxidizer, a brine with an enzyme breaker, a brine with a mutual solvent, and an oil-based fluid with a mutual solvent. The chemical-acting cleanup fluid may further include stabilizers, friction reducers, viscosifiers, and/or other additives as will be understood to those of skill in the art. The operation to inject a chemical-acting cleanup fluid is performed for a sufficient amount of time to loosen a portion of an amount of solids embedded in the filtercake.

The sufficient amount of time is understood to one of skill in the art based upon specific factors that are typically known with respect to a specific application. The specific factors include at least the polymer type and loading amount in the drilling fluid that created the filtercake, the amount of drilling fluid lost to the formation of interest during the operation to drill the wellbore, the temperature of the formation of interest, the temperature of the chemical-acting cleanup fluid as positioned in the wellbore at the formation of interest, and the type and loading amount of the materials (e.g. the breakers and/or solvents) in the cleanup fluid that perform the chemical action on the filtercake. In certain embodiments, the operation to inject a chemical-acting cleanup fluid includes delivering the chemical-acting cleanup fluid to the formation of interest and soaking the chemical-acting cleanup fluid for the sufficient amount of time.

The technique further includes an operation to circulate a solids removal fluid through the wellbore across the face of the formation of interest. The solids removal fluid is circulated at a combination of circulation rate and fluid viscosity such that the solids removal fluid carries the solids loosened by the operation out of the wellbore. The selection of circulation rates and fluid viscosities for the operation are mechanical steps to one of skill in the art having the benefit of the disclosures herein, and can be determined according to parameters including the diameters, lengths, and depths of the wellbore fluid conduits (casing, tubing, washpipe, open hole wellbore segments, annuli), the fluid pressure and fracture pressure of the formation of interest, the desired fluid velocity past the formation of interest to agitate loosened solids away from the filtercake remainder, and the density and size of the loosened solids particles. The amount of leakoff into the formation of interest and the invasion of the solids by the formation is minimized because the bulk of the bridging agents deposited by the drilling fluid during drilling remain embedded in the formation of interest. The solids removed by the operation are primarily drilling solids entrained in the drilling fluid and deposited at the formation of interest during the operation to drill. However, any loosened solids present may be removed, including at least solidified or pseudo-solid portions of the filtercake and/or poorly embedded amounts of bridging agent.

The solids removal fluid includes any fluid known in the art having appropriate properties including friction, viscosity, particle carrying capacity, and formation compatibility characteristics. Specific examples, without limitation, include aqueous fluids having clay-, silt-, and sand-suspending surfactants, aqueous fluids with viscoelastic surfactants (VES), viscosified brines, and an oil-external water-internal emulsion. A viscosified fluid, where present, is viscosified by any viscosifier understood in the art including at least hydroxyl-ethyl-cellulose, xanthan, and a VES.

The technique further includes an operation to run a sand control screen into the well before the operation to circulate the solids removal fluid. The technique may further include an operation to expand an expandable sand control screen, or an operation to perform a gravel pack treatment in the wellbore. Certain applications do not have a sand control screen present. The operation to perform the gravel pack treatment may include performing the gravel pack treatment with the second treatment fluid.

The technique can include setting a packer and/or running a sand control screen. In one embodiment, the technique includes running the sand control screen before injecting the chemical-acting cleanup fluid and setting the packer after allowing the water-degradable particles to dissolve. In an alternate embodiment, the technique includes setting the packer before injecting the chemical-acting cleanup fluid and running the sand control screen after allowing the water-degradable particle to dissolve. Yet another embodiment includes running the sand control screen before the injecting the chemical-acting cleanup fluid, and the packer, if present, may be set at any time.

The technique further includes an operation to position a second treatment fluid having a self-destructing fluid loss control pill including water-degradable particles formed from a solid polymeric acid precursor material in the wellbore at the formation of interest. The second treatment fluid may further include non-water-degradable particles. In certain embodiments, the technique includes generating an acid by degrading the water-degradable particles formed from a solid polymeric acid precursor material and degrading the non-water-degradable particles with the formed acid. In certain embodiments, the degradation product of the water-degradable particles and/or the degradation product of the non-water-degradable particles form a material (e.g. an acid) that dissolves a bridging agent remaining from the drilling fluid.

In certain alternative embodiments, the second treatment fluid includes a dissolution agent that dissolves the bridging agent. In certain embodiments, the bridging agent may dissolve in the dissolution agent but not in the acid formed from the degraded water-degradable particles. The dissolution agent dissolves the bridging agent deposited in the formation of interest or at the face of the formation interest by the drilling fluid. Non-limiting examples of bridging agents include sized salt particles, calcium carbonate particles, and/or barite particles, and non-limiting examples of dissolution agents include an acid, an acid precursor, a chelating agent solution, and/or an unsaturated brine. Any bridging agent understood in the art with any corresponding dissolution agent is contemplated herein.

In certain embodiments, the drilling fluid is an oil-based drilling fluid, and the second treatment fluid includes one or more of the following fluids: a combination of an aqueous fluid, a chelating agent solution, a water wetting surfactant, and a mutual solvent; an oil-external water-internal emulsion combined with a chelating agent solution; or an oil-external water-internal emulsion including a low-corrosion organic acid in the internal phase of the emulsion.

The self-destructing fluid loss control pill allows diversion of the second treatment fluid to promote treating a large fraction of the entire formation of interest, which can be especially important for an injection well to ensure high sweep efficiency and to ensure that maximum contact occurs between the bridging agent in place and the dissolution agent or particles of the second treatment fluid that degrade and release an acid or other material to promote dissolution of the bridging agent. The self-destructing fluid loss control pill includes any material having diversion capabilities—i.e. that preferentially flows to and at least partially blocks flow to areas of the formation of interest that have the least bridging agent deposition and least resistance to flow—and that further breaks down under the conditions present in the wellbore after placement of the second treatment fluid at the formation of interest. Non-limiting examples of self-destructing fluid loss control pill materials include: a visco-elastic surfactant, an amount of water degradable particles, an amount of water degradable particles having an acid precursor, and/or an amount of water degradable particles having an acid precursor with an amount of acid degradable particles.

In certain embodiments, the water-degradable particles formed from a solid polymeric acid precursor include an acid precursor such as: homopolymers of lactic acid, glycolic acid, hydroxybutyrate, hydroxyvalerate, epsilon caprolactone, L-serine, L-threonine, and L-tyrosine; block copolymers of at least two of polyglycolic acid, polylactic acid, hydroxybutyrate, hydroxyvalerate, epsilon caprolactone, L-serine, L-threonine, and L-tyrosine; homopolymers of ethyleneterephthalate (PET), butyleneterephthalate (PBT) and ethylenenaphthalate (PEN); random copolymers of at least two of ethyleneterephthalate, butyleneterephthalate and ethylenenaphthalate; and/or block copolymers of at least two of ethyleneterephthalate, butyleneterephthalate and ethylenenaphthalate.

The technique further includes allowing the water-degradable particles to dissolve, and/or may include allowing the bridging agent to dissolve. Allowing the water-degradable particles and/or the bridging agent to dissolve can include shutting in the wellbore after the operation to position the second treatment fluid. In one example, the technique includes allowing the water degradable particles to dissolve degrading the diversion agent of the fluid loss control pill. In another example, the operation includes allowing the water-degradable particles to dissolve, releasing the acid precursor into solution and assisting in dissolving the non-water-degradable particles. In another example, the fluid loss control pill includes a visco-elastic surfactant (VES) and the operation includes allowing the VES time at downhole temperatures and/or exposure to reservoir fluids to break a micelle structure in the VES.

The technique further includes an operation to inject a mutual solvent into the formation of interest, and/or an operation to briefly produce from the formation of interest. The operations to inject a mutual solvent and to briefly produce from the formation of interest are optional and may enhance well injectivity. The operations to inject a mutual solvent and to briefly produce from the formation of interest are performed after the operation to degrade the degradable particles.

An alternate technique for injection well clean-up operations includes an operation to inject a polymer hydrolyzing cleanup fluid into a wellbore and contacting the polymer hydrolyzing cleanup fluid with a filtercake on a face of a formation of interest for a first period of time sufficient to loosen a portion of an amount of solids embedded in the filtercake. The polymer hydrolyzing cleanup fluid includes similar considerations to the chemical-acting cleanup fluid described the chemical-acting cleanup fluid preceding, where the hydrolyzing cleanup fluid includes an oxidizer and/or an enzyme breaker. The technique further includes an operation to circulate a solids removal fluid through the wellbore across the face of the formation of interest, where a circulation rate and solids removal fluid viscosity are such that the solids removal fluid carries the loosened amount of solids from the wellbore.

In certain embodiments, the technique further includes an operation to size water-degradable particles having an acid precursor and non-water-degradable particles such that, when mixed, the resulting particles exhibit certain packing features. The exhibited packing features include: a particle pack having a low permeability, a particle pack having a permeability <25 milli-Darcy (mD), particles that facilitate bridging at screen openings in a sand control screen, and particles that facilitate bridging within formation pore throats.

In an exemplary embodiment, the bridging agent does not dissolve in the acid formed by the degrading water-degradable particles, and the second treatment fluid includes a dissolution agent that dissolves the bridging agent. The dissolution agent may be in solution in the second treatment fluid, and/or may be incorporated in particles that dissolve in the acid formed by the degrading water-degradable particles.

The technique further includes an operation to position a second treatment fluid having a self-destructing fluid loss control pill including water-degradable particles formed from a solid polymeric acid precursor material in the wellbore at the formation of interest. In a further embodiment, the fluid loss control pill includes non-water-degradable particles that degrade in acid formed by the degraded water-degradable particles. The second treatment fluid further includes a material that dissolves a bridging agent remaining from the drilling fluid, and the technique includes allowing the bridging agent, the water-degradable particles, and/or the non-water-degradable particles to degrade.

Another alternate technique for injection well clean-up operations is utilized, in one example, where the drilling fluid is an oil-based drilling fluid. The technique includes an operation to inject a chemical-acting cleanup fluid into a wellbore and contact the chemical-acting cleanup fluid with a filtercake. An exemplary chemical-acting cleanup fluid includes a base-oil combined with a mutual solvent. Another exemplary chemical-acting cleanup fluid includes a brine combined with a mutual solvent.

The technique further includes an operation to circulate a solids removal fluid through the wellbore across the formation of interest with a circulation rate and solids removal fluid viscosity such that the solids removal fluid carries the loosened amount of solids from the wellbore. The solids removal fluid includes a viscosified brine or an oil-water (oil-external) emulsion. The technique further includes an operation to position a second treatment fluid having a self-destructing fluid loss control pill including water-degradable particles formed from a solid polymeric acid precursor material in the wellbore at the formation of interest.

An exemplary second treatment fluid includes a combination of an aqueous fluid, a chelating agent solution, a water wetting surfactant, and a mutual solvent. Another exemplary second treatment fluid includes an oil-external water-internal emulsion combined with a chelating agent solution. Yet another exemplary second treatment fluid includes an oil-external water-internal emulsion including a low-corrosion organic acid in the internal phase of the emulsion. The technique further includes an operation to allow the water-degradable particles to dissolve.

Yet another alternate technique for injection well clean-up operations includes operations where a wellbore has not been produced. The technique includes an operation to inject a chemical-acting cleanup fluid and contact it with a filtercake on a face of a formation of interest for a first period of time sufficient to loosen a portion of an amount of solids embedded in the filtercake. The technique further includes an operation to circulating a solids removal fluid at a high rate through the wellbore across the face of the formation of interest, where the solids removal fluid includes a viscosifier. The technique further includes an operation to expand an expandable sand control screen, or an operation to perform a gravel pack treatment; after the operation to circulate the solids removal fluid. The technique further includes an operation to position a second treatment fluid having a self-destructing fluid loss control pill including water-degradable particles formed from a solid polymeric acid precursor material and allowing the water-degradable particles to dissolve. The operation may include injecting a mutual solvent into the formation of interest after allowing the water-degradable particles to dissolve.

An apparatus is contemplated for removing drilling damage from a formation in a wellbore that has not been produced, or that has not produced a significant amount of fluid. The apparatus includes means for chemically loosening an amount of solids embedded in a filtercake disposed on a face of a formation of interest, means for removing loosened solids from a wellbore intersecting the formation of interest, means for treatment fluid diversion to treat an entire interval of the formation of interest, means for dissolving a bridging agent embedded in the face of the formation, and means for degrading a solids remainder from the means for treatment fluid diversion.

The means for chemically loosening an amount of solids embedded in a filtercake disposed on a face of a formation of interest includes a brine with an oxidizer breaker, a brine with an enzyme-based breaker, a fluid having a mutual solvent, a fluid having a chemical that hydrolyzes a polymer present in the filtercake, and/or a fluid having a chemical that dissolves a material present in the filtercake.

The means for removing loosened solids from a wellbore intersecting the formation of interest includes circulating a fluid at a high rate past the face of the formation of interest where the fluid includes: a clay, silt-, and/or sand-suspending surfactant, a viscosified fluid, a viscosified brine, a VES based fluid, and/or an oil-external water-internal emulsion.

The means for treatment fluid diversion to treat an entire interval of the formation of interest include a VES, a fluid having water-degradable particles formed from a solid polymeric acid precursor material, a fluid having non-water-degradable particles, a fluid having non-water-degradable particles, a fluid having more than one type of particle where the particle types are sized to exhibit a desired particle pack feature such as low permeability or a bridging characteristic, and an oil-external water-internal emulsion.

The means for dissolving a bridging agent embedded in the face of the formation include injecting an a fluid including un-saturated brine, a fluid having an acid, a fluid having a chelating agent solution, a fluid having water soluble acid precursor particles, a fluid having a water-wetting surfactant combined with a mutual solvent, and a fluid having a first water degradable acid precursor particle and a second acid degradable particle having a bridging agent dissolution material such as a chelating agent.

The means for degrading a solids remainder from the means for treatment fluid diversion include degrading a VES through time, temperature and reservoir fluids, degrading a VES through chemicals released from water soluble particles, degrading water soluble particles with water present at downhole conditions, and degrading acid soluble particles through acid released from water soluble acid precursor particles.

As is evident from the figures and text presented above, a variety of embodiments according to the present invention are contemplated.

One exemplary embodiment is a method including drilling a wellbore through a formation of interest with a drilling fluid comprising a bridging agent and a filtercake developing agent, and, before producing significant fluid from the formation of interest, injecting a chemical-acting cleanup fluid and contacting therewith a filtercake on a face of the formation of interest for a first period of time sufficient to loosen a portion of an amount of solids embedded in the filtercake. The method further includes circulating a solids removal fluid through the wellbore across the face of the formation of interest, where a circulation rate and solids removal fluid viscosity are such that the solids removal fluid carries the loosened amount of solids from the wellbore, positioning a second treatment fluid having a self-destructing fluid loss control pill including water-degradable particles formed from a solid polymeric acid precursor material in the wellbore at the formation of interest, and allowing the water-degradable particles to degrade. The method further includes performing a gravel pack treatment, which may be performed after the circulating the solids removal fluid. In certain embodiments, the method further includes performing the gravel pack treatment with the second treatment fluid. In an alternate embodiment, the exemplary method includes expanding an expandable sand control screen after the circulating the solids removal fluid. The exemplary method further includes injecting a mutual solvent into the formation of interest after the allowing. In certain embodiments, the exemplary method includes briefly producing from the formation of interest.

In certain embodiments, the bridging agent is a material that is not dissolved in the dissolution product of the water-degradable particles, and the second treatment fluid further includes a dissolution agent that dissolves the bridging agent. The dissolution agent includes an acid, a chelating agent solution, and/or an unsaturated brine. The fluid loss control pill includes, in certain embodiments, a visco-elastic surfactant, and may further include an amount of water degradable particles, an amount of water-degradable particles having an acid precursor, and/or an amount of water-degradable particles having an acid precursor with an amount of acid degradable particles. The water-degradable particles formed from a polymeric acid precursor material include one or more acid precursors selected from: homopolymers of lactic acid, glycolic acid, hydroxybutyrate, hydroxyvalerate, epsilon caprolactone, L-serine, L-threonine, and L-tyrosine; block copolymers of at least two of polyglycolic acid, polylactic acid, hydroxybutyrate, hydroxyvalerate, epsilon caprolactone, L-serine, L-threonine, and L-tyrosine; homopolymers of ethylenetherephthalate (PET), butylenetherephthalate (PBT) and ehtylenenaphthalate (PEN); random copolymers of at least two of ethylenetherephthalate, butylenetherephthalate and ethylenenaphthalate; and/or block copolymers of at least two of ethylenetherephthalate, butylenetherephthalate and ethylenenaphthalate.

In certain embodiments, the drilling fluid is an oil-based drilling fluid, and the chemical-acting cleanup fluid includes a base-oil with a mutual solvent or a brine with a mutual solvent. The solids removal fluid may further include a viscosified brine or an oil-external water-internal emulsion. The second treatment fluid may include a combination of an aqueous fluid, a chelating agent solution, a water wetting surfactant, and a mutual solvent; an oil-external water-internal emulsion combined with a chelating agent solution; and/or an oil-external water-internal emulsion including a low-corrosion organic acid in the internal phase of the emulsion.

Another exemplary embodiment is a method including injecting a polymer hydrolyzing cleanup fluid into a wellbore and contacting it with a filtercake on a face of a formation of interest for a first period of time sufficient to loosen a portion of an amount of solids embedded in the filtercake. The exemplary method further includes circulating a solids removal fluid through the wellbore across the face of the formation of interest, where a circulation rate and solids removal fluid viscosity are such that the solids removal fluid carries the loosened amount of solids from the wellbore, and positioning a second treatment fluid having a self-destructing fluid loss control pill including water-degradable particles formed from a solid polymeric acid precursor material in the wellbore at the formation of interest, and allowing the water-degradable particles to degrade. The polymer hydrolyzing cleanup fluid may include an enzyme and/or an oxidizer. The solids removal fluid includes a viscosifier such as hydroxyl-ethyl cellulose, xanthan, and/or a viscoelastic surfactant. The second treatment fluid includes a viscosifier such as hydroxyl-ethyl cellulose, xanthan, and/or a viscoelastic surfactant.

In certain embodiments, the fluid loss control pill includes an amount of water-degradable particles having an acid precursor with an amount of non-water-degradable particles that may be non-water-degradable particles. In an exemplary embodiment, the amount of water-degradable particles and the non-water-degradable particles are sized such that a particle pack formed by the particles provides a permeability of less than about 25 milli-Darcy. In another exemplary embodiment, the amount of water-degradable particles and the non-water-degradable particles are sized such that the particles facilitate bridging at openings consisting of at least one of a sand screen and formation pore throats.

Yet another exemplary embodiment is a method including injecting a chemical-acting cleanup fluid into a wellbore and contacting it with a filtercake on a face of a formation of interest for a first period of time sufficient to loosen a portion of an amount of solids embedded in the filtercake. The method further includes circulating a solids removal fluid including a viscosified brine or an oil-external water-internal emulsion through the wellbore across the face of the formation of interest, with a circulation rate and solids removal fluid viscosity such that the solids removal fluid carries the loosened amount of solids from the wellbore. The method further includes positioning a second treatment fluid having a self-destructing fluid loss control pill including water-degradable particles formed from a solid polymeric acid precursor material in the wellbore at the formation of interest, and allowing the water-degradable particles to degrade. The second treatment fluid includes a treatment fluid such as a combination of an aqueous fluid, a chelating agent solution, a water wetting surfactant, and a mutual solvent, an oil-external water-internal emulsion combined with a chelating agent solution, and/or an oil-external water-internal emulsion including a low-corrosion organic acid in the internal phase of the emulsion. In an exemplary embodiment, the chemical-acting cleanup fluid includes a base-oil and a brine, and further includes a mutual solvent.

Yet another exemplary embodiment is a method for removing drilling damage from a formation in a wellbore that has not been produced, the method including injecting a chemical-acting cleanup fluid and contacting it with a filtercake on a face of a formation of interest for a first period of time sufficient to loosen a portion of an amount of solids embedded in the filtercake. The method further includes circulating a solids removal fluid at a high rate through the wellbore across the face of the formation of interest, the solids removal fluid including a viscosifier, positioning a second treatment fluid having a self-destructing fluid loss control pill including water-degradable particles formed from a solid polymeric acid precursor material in the wellbore at the formation of interest, and allowing the water-degradable particles to degrade. The method further includes performing a gravel pack treatment after the circulating the solids removal fluid, and injecting a mutual solvent into the formation of interest after the allowing. The self-destructing fluid loss control pill includes particles such as: an amount of water degradable particles, an amount of water degradable particles having an acid precursor, and/or an amount of water degradable particles having an acid precursor combined an amount of particles degradable in acid but not in water. The method further includes performing a gravel pack, performing a gravel pack with the second treatment fluid, or expanding an expandable sand control screen after the circulating the solids removal fluid.

Yet another exemplary embodiment is an apparatus for removing drilling damage from a formation in a wellbore that has not been produced. The apparatus includes means for chemically loosening an amount of solids embedded in a filtercake disposed on a face of a formation of interest, means for removing loosened solids from a wellbore intersecting the formation of interest, means for treatment fluid diversion to treat an entire interval of the formation of interest, means for dissolving a bridging agent embedded in the face of the formation, and means for degrading a solids remainder from the means for treatment fluid diversion.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
   drilling a wellbore through a formation of interest with a drilling fluid comprising a bridging agent and a filtercake developing agent to form a filtercake on a face of the formation of interest, and, before producing significant fluid from the formation of interest:
   running a sand control screen;
   after running the sand control screen, injecting a chemical-acting cleanup fluid to contact the filtercake for a first period of time sufficient to loosen a portion of an amount of solids embedded in the filtercake;
   then circulating a solids removal fluid through the wellbore across the face of the formation of interest, where a circulation rate and a solids removal fluid viscosity are such that the solids removal fluid carries the loosened amount of solids from the wellbore;
   then positioning a second treatment fluid comprising a self-destructing fluid loss control pill including water-degradable particles formed from a solid polymeric acid precursor material in the wellbore at the formation of interest;
   then allowing the water-degradable particles to dissolve; and
   then setting a packer.

2. The method of claim 1, wherein the second treatment fluid further includes non-water-degradable particles, the method further comprising forming an acid from the degrading water-degradable particles and degrading the non-water-degradable particles with the acid.

3. The method of claim 1, further comprising performing a gravel pack treatment in the wellbore.

4. The method of claim 3, further comprising performing the gravel pack treatment with the second treatment fluid.

5. The method of claim 1, further comprising briefly producing from the formation of interest after allowing the water-degradable particles to dissolve.

6. The method of claim 1, wherein the second treatment fluid further includes at least one agent selected from the agents consisting of: an acid, a chelating agent solution, and an unsaturated brine.

7. The method of claim 1, wherein the second treatment fluid further includes a visco-elastic surfactant.

8. The method of claim 1, wherein the water-degradable particles formed from a solid polymeric acid precursor material comprise at least one acid precursor selected from the acid precursors consisting of:
- homopolymers of lactic acid, glycolic acid, hydroxybutyrate, hydroxyvalerate, epsilon caprolactone, L-serine, L-threonine, and L-tyrosine;
- block copolymers of at least two of polyglycolic acid, polylactic acid, hydroxybutyrate, hydroxyvalerate, epsilon caprolactone, L-serine, L-threonine, and L-tyrosine;
- homopolymers of ethyleneterephthalate (PET), butyleneterephthalate (PBT) and ethylenenaphthalate (PEN);
- random copolymers of at least two of ethyleneterephthalate, butyleneterephthalate and ethylenenaphthalate; and
- block copolymers of at least two of ethyleneterephthalate, butyleneterephthalate and ethylenenaphthalate.

9. The method of claim 1, wherein the sand control screen is an expandable sand control screen, the method further comprising expanding the sand control screen.

10. The method of claim 1, wherein at least one of the chemical-acting cleanup fluid, the solids removal fluid, and the second treatment fluid comprise a clay stabilizer.

11. The method of claim 1, wherein the drilling fluid is an oil-based drilling fluid, and wherein the chemical-acting cleanup fluid comprises a mutual solvent combined with one of a base-oil and a brine.

12. The method of claim 11, wherein the solids removal fluid comprises one of a viscosified brine and an oil-external water-internal emulsion.

13. The method of claim 11, wherein the second treatment fluid comprises a treatment fluid selected from the treatment fluids consisting of:
- a combination of an aqueous fluid, a chelating agent solution, a water wetting surfactant, and the mutual solvent;
- an oil-external water-internal emulsion combined with a chelating agent solution; and
- an oil-external water-internal emulsion including a low-corrosion organic acid in the internal phase of the emulsion.

14. The method of claim 1, wherein the bridging agent comprises a material that is not dissolved in the dissolution product of the water-degradable particles, and wherein the second treatment fluid further comprises a dissolution agent that dissolves the bridging agent.

15. The method of claim 1, wherein the chemical-acting cleanup fluid comprises one of an enzyme and an oxidizer.

16. The method of claim 1, wherein the solids removal fluid comprises a viscosifier selected from the viscosifiers consisting of: hydroxyl-ethyl cellulose, xanthan, and a viscoelastic surfactant.

17. The method of claim 1, wherein the second treatment fluid comprises a viscosifier selected from the viscosifiers consisting of: hydroxyl-ethyl cellulose, xanthan, and a viscoelastic surfactant.

18. The method of claim 2, wherein the water-degradable particles and the non-water-degradable particles are sized such that a particle pack formed by the water-degradable particles and the non-water-degradable particles provides a permeability of less than about 25 milli-Darcy.

19. The method of claim 2, wherein the water-degradable particles and the non-water-degradable particles are sized such that the water-degradable particles and the non-water-degradable particles facilitate bridging at openings consisting of at least one of a sand screen and formation pore throats.

20. The method of claim 1, wherein the solids removal fluid comprises one of a viscosified brine and an oil-external water-internal emulsion, and wherein the second treatment fluid comprises a treatment fluid selected from the treatment fluids consisting of:
- a combination of an aqueous fluid, a chelating agent solution, a water wetting surfactant, and a mutual solvent;
- an oil-external water-internal emulsion combined with a chelating agent solution; and
- an oil-external water-internal emulsion including a low-corrosion organic acid in the internal phase of the emulsion.

21. The method of claim 1, wherein the solids removal fluid comprises one of a viscosified brine and an oil-external water-internal emulsion, and wherein the chemical-acting cleanup fluid comprises a mutual solvent combined with one of a base-oil and a brine.

22. A method, comprising:
- drilling a wellbore through a formation of interest with a drilling fluid comprising a bridging agent and a filtercake developing agent to form a filtercake on a face of the formation of interest, and, before producing significant fluid from the formation of interest:
- running a sand control screen;
- setting a packer;
- after setting the packer, injecting a chemical-acting cleanup fluid to contact the filtercake for a first period of time sufficient to loosen a portion of an amount of solids embedded in the filtercake;
- then circulating a solids removal fluid through the wellbore across the face of the formation of interest, where a circulation rate and a solids removal fluid viscosity are such that the solids removal fluid carries the loosened amount of solids from the wellbore;
- then positioning a second treatment fluid comprising a self-destructing fluid loss control pill including water-degradable particles formed from a solid polymeric acid precursor material in the wellbore at the formation of interest; and
- then allowing the water-degradable particles to dissolve.

23. The method of claim 22, wherein the second treatment fluid further includes non-water-degradable particles, the method further comprising forming an acid from the degrading water-degradable particles and degrading the non-water-degradable particles with the acid.

24. The method of claim 22, further comprising performing a gravel pack treatment in the wellbore with the second treatment fluid.

25. The method of claim 22, further comprising injecting a mutual solvent into the formation of interest after allowing the water-degradable particles to dissolve.

26. The method of claim 22, wherein the second treatment fluid further includes at least one agent selected from the agents consisting of: an acid, a chelating agent solution, and an unsaturated brine.

27. The method of claim 22, wherein the second treatment fluid further includes a visco-elastic surfactant.

28. The method of claim 22, wherein the water-degradable particles formed from a solid polymeric acid precursor material comprise at least one acid precursor selected from the acid precursors consisting of:

homopolymers of lactic acid, glycolic acid, hydroxybutyrate, hydroxyvalerate, epsilon caprolactone, L-serine, L-threonine, and L-tyrosine;

block copolymers of at least two of polyglycolic acid, polylactic acid, hydroxybutyrate, hydroxyvalerate, epsilon caprolactone, L-serine, L-threonine, and L-tyrosine;

homopolymers of ethyleneterephthalate (PET), butyleneterephthalate (PBT) and ethylenenaphthalate (PEN);

random copolymers of at least two of ethyleneterephthalate, butyleneterephthalate and ethylenenaphthalate; and block copolymers of at least two of ethyleneterephthalate, butyleneterephthalate and ethylenenaphthalate.

29. The method of claim 22, wherein at least one of the chemical-acting cleanup fluid, the solids removal fluid, and the second treatment fluid comprise a clay stabilizer.

30. The method of claim 22, wherein the drilling fluid is an oil-based drilling fluid, wherein the chemical-acting cleanup fluid comprises a mutual solvent combined with one of a base-oil and a brine, and wherein the solids removal fluid comprises one of a viscosified brine and an oil-external water-internal emulsion.

31. The method of claim 22, wherein the second treatment fluid comprises a treatment fluid selected from the treatment fluids consisting of:

a combination of an aqueous fluid, a chelating agent solution, a water wetting surfactant, and the mutual solvent;

an oil-external water-internal emulsion combined with a chelating agent solution; and an oil-external water-internal emulsion including a low-corrosion organic acid in the internal phase of the emulsion.

32. The method of claim 22, wherein the bridging agent comprises a material that is not dissolved in the dissolution product of the water-degradable particles, and wherein the second treatment fluid further comprises a dissolution agent that dissolves the bridging agent.

* * * * *